United States Patent

McGrath, Jr.

[11] Patent Number: 5,927,793
[45] Date of Patent: Jul. 27, 1999

[54] SELF-DEPLOYING VEHICLE COVER

[76] Inventor: Frederick T. McGrath, Jr., 4001 DuPont Ave. S., Minneapolis, Minn. 55409

[21] Appl. No.: 08/790,844

[22] Filed: Jan. 30, 1997

[51] Int. Cl.$^6$ ..................................................... B60J 11/00
[52] U.S. Cl. ....................... 296/136; 296/95.1; 114/361; 150/166; 160/370.21
[58] Field of Search ................... 296/95.1, 97.7, 296/97.8, 136; 150/166; 244/1 R; 114/361; 403/384, 389; 160/370.21

[56] References Cited

U.S. PATENT DOCUMENTS

| | | | |
|---|---|---|---|
| 2,570,533 | 10/1951 | Elliot | 150/166 |
| 2,639,751 | 7/1953 | Flaherty | 114/361 |
| 2,874,709 | 2/1959 | Cohen et al. | 150/166 |
| 3,990,463 | 11/1976 | Norman . | |
| 4,216,989 | 8/1980 | Tackett . | |
| 4,273,465 | 6/1981 | Schoen | 403/389 X |
| 4,598,883 | 7/1986 | Suter | 244/1 R |
| 4,842,324 | 6/1989 | Carden . | |
| 4,948,191 | 8/1990 | Cao | 296/95.1 |
| 5,024,262 | 6/1991 | Huang | 296/97.8 X |
| 5,035,460 | 7/1991 | Huang | 296/97.7 X |
| 5,161,849 | 11/1992 | Holland, Jr. | 296/95.1 |
| 5,163,461 | 11/1992 | Ivanovich et al. . | |
| 5,396,917 | 3/1995 | Hazinski et al. . | |
| 5,435,362 | 7/1995 | Chiang . | |
| 5,497,819 | 3/1996 | Chian | 296/95.1 X |
| 5,547,734 | 8/1996 | Tusch | 296/95.1 X |
| 5,615,923 | 4/1997 | Madison | 296/95.1 |

OTHER PUBLICATIONS

The Leader in Automotive Protection, Covercraft, Form No. 590, pp. 2–23, 1995.
Magnetic Heavy Duty Windshield Cover, *Carol Wright Gifts* (advertisement).
Pop-Tent, *TWA Ambassador*, Sep. 1994, p. 14.
The Leader in Automotive Protection, *Covercraft*, 1995, Form No. 590, pp. 2–23.

Primary Examiner—Joseph D. Pape
Assistant Examiner—Chad D. Wells
Attorney, Agent, or Firm—Gerald E. Helget; Mackall, Crounse & Moore, PLC

[57] ABSTRACT

A self-deploying cover for the cab of a vehicle, including a roof, windshield, rear window and side windows, the cover comprising a fabric sheet having substantially the general dimensions of the cab for enclosing the cab when the cover is placed on the vehicle. A collapsible, semi-rigid frame or spring rod is along the periphery of the sheet for deploying the cover to an expanded state from a stored state. Connectors are provided for attaching the cover to the vehicle, suitably at the wheel wells. In another embodiment, the cover includes a skirt for covering other lower areas of the vehicle. In a third embodiment, the skirt also has a collapsible, semi-rigid frame or a spring for deploying the skirt.

19 Claims, 4 Drawing Sheets

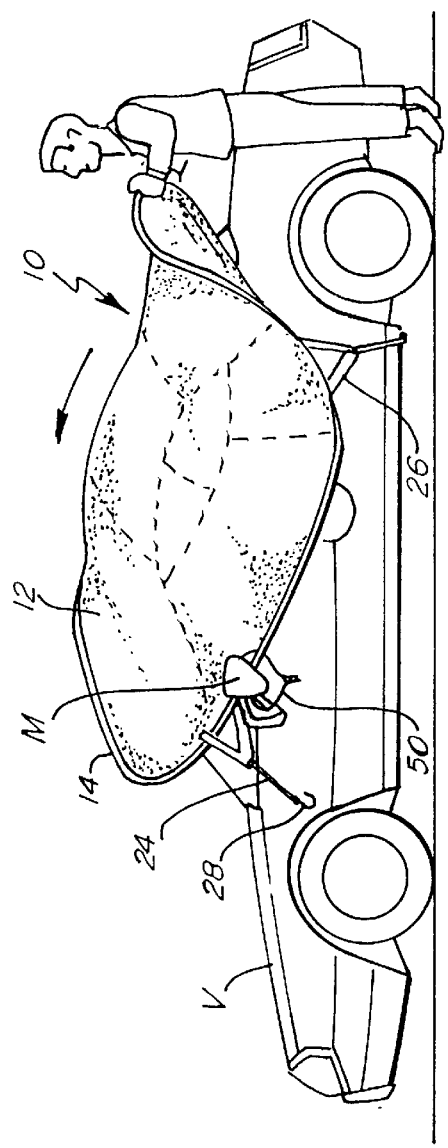
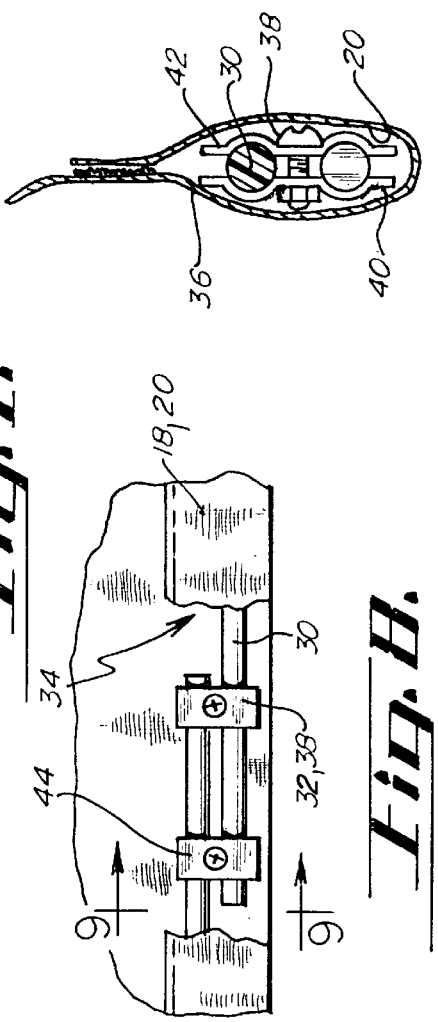
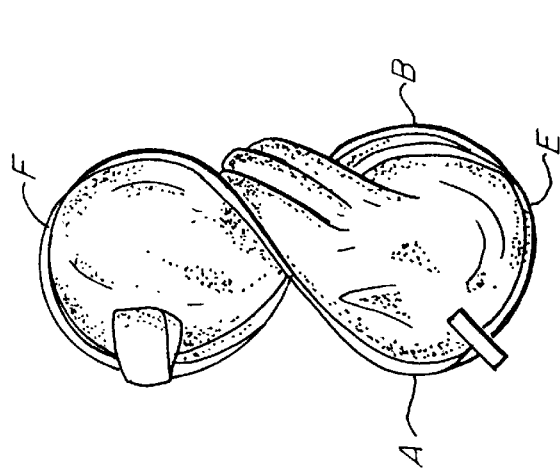
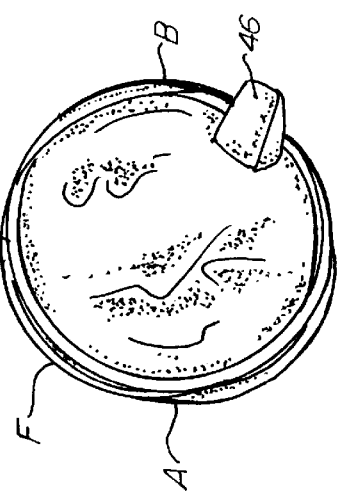

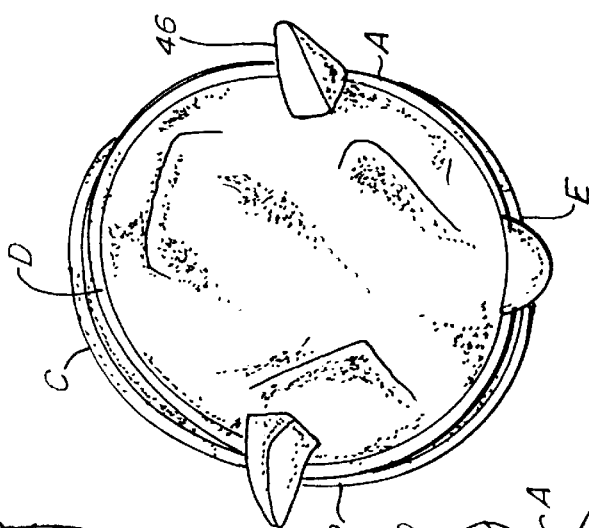
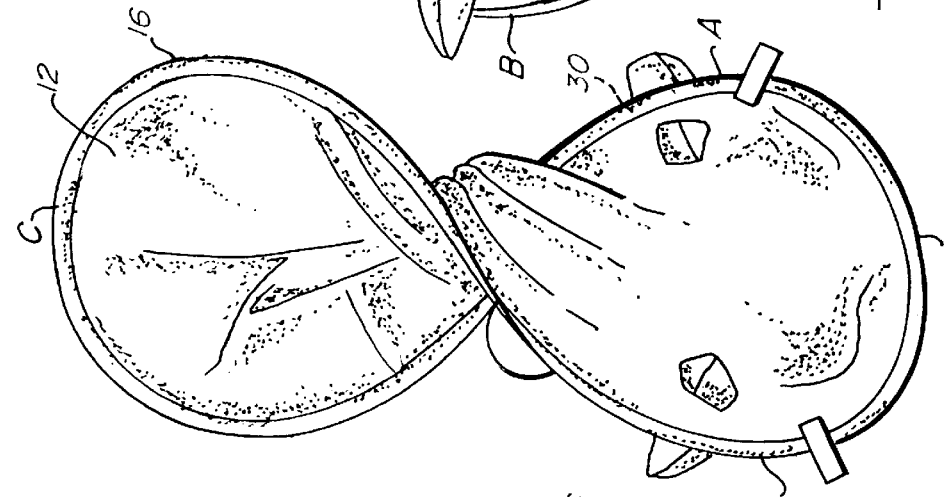
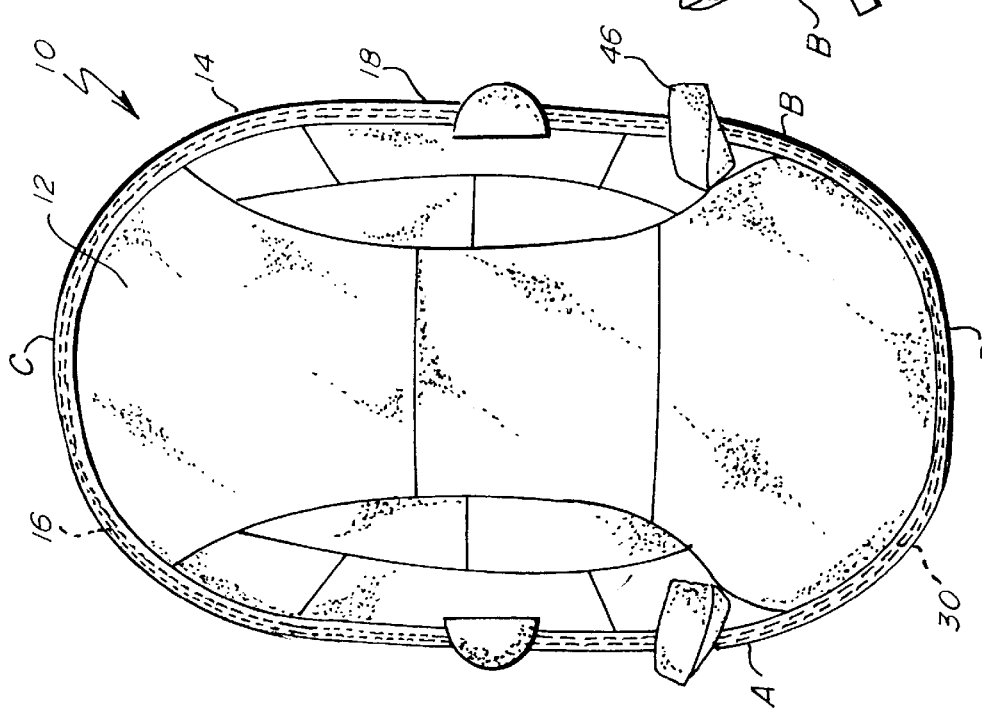

5,927,793

SELF-DEPLOYING VEHICLE COVER

BACKGROUND OF THE INVENTION

Motor vehicles, and particularly privately owned automobiles, are susceptible to being rendered uncomfortable and to being damaged by periodic exposure to the sun and weather. One especially vexing problem for the typical owner of a car is that when parked temporarily in the sun, the passenger compartment quickly becomes quite hot (greenhouse effect). This is very uncomfortable to passengers upon returning to the vehicle. It is also potentially damaging to the car and its contents. Plastic and leather fabrics and coverings are more rapidly aged or dried by exposure to heat or to ultraviolet light which enters the cab. Certain personal property commonly carried in cars, such as magnetic audio tapes, are also quite susceptible to damage from heat.

Other environmental hazards which are desirable to avoid include dust, dirt, rain, snow, frost and ice formation on vehicle windows, wiper blades, door handles and key holes.

Motor vehicle covers have been developed to protect vehicles from these conditions. Some are full body covers, that is, covers which envelope or cover an entire vehicle body. Others are designed specifically to cover only the window area, since both heat and window fouling hazards impinge principally on the cab area of motor vehicles. A cover which covers the windows only, or which covers roof and windows, will be termed a cab cover. A full body cover can be awkward and unwieldy to install, unattractive, and may occupy a large amount of space when stored. In particular, a full body cover must generally be exactly shaped to conform to the vehicle body in order to avoid unsightly bulges and to keep from being blown off the vehicle by the wind.

Previous covers have not found a wide market, principally because they are difficult to put on the vehicle. Even a cab cover must be unfolded, placed around the cab, and secured in place at the same time that the cover has a tendency to move around on the cab or slip off the cab. A full body cover is even more difficult to install, because of the length of the vehicle. The cover must be thrown over the vehicle, one end secured, and then the other end secured. The cover has a tendency to slip off the first end while the other end is being secured.

There is a need for a self-deploying cover with an internal frame that gives the cover sufficient rigidity that the cover can be properly oriented, picked up and placed over the vehicle's cab by one person and remain over the cab without sliding off while the cover is secured to the vehicle, suitably by straps to the wheel wells. However, the semi-rigid frame must be foldable so that the cover takes up a minimum amount of room for storage in the vehicle. Such a cover would enhance the user's lifestyle by providing a cool car with minimal work. There is also a need for a full body cover with similar characteristics.

Although the cover is primarily intended for automobiles, it will also find use on trucks, airplanes, boats, snowmobiles, all-terrain vehicles, personal water crafts and agricultural equipment.

SUMMARY OF THE INVENTION

A self-deploying cover for the cab of a vehicle, including a roof, windshield, rear window and side windows, the cover comprising a fabric sheet having substantially the general dimensions of the cab for enclosing the cab when the cover is placed on the vehicle. A collapsible, semi-rigid frame or spring rod is along the periphery of the sheet for deploying the cover to an expanded state from a stored state. Connectors are provided for attaching the cover to the vehicle, suitably at the wheel wells. In another embodiment, the cover includes a skirt for covering other lower areas of the vehicle. In a third embodiment, the skirt also has a collapsible, semi-rigid frame or a spring for deploying the skirt.

BRIEF DESCRIPTION OF THE DRAWINGS

FIG. 1 shows the self-deploying cover of the present invention being placed on a vehicle.

FIG. 2 shows the self-deploying cover of the present invention in place on a vehicle.

FIG. 3 is a plan view of the self-deploying cover of the present invention in the expanded state.

FIG. 4 shows the self-deploying cover of the present invention being twisted into a figure-eight shape for storage.

FIG. 5 shows the self-deploying cover of the present invention after the loops of the figure-eight have been folded together.

FIG. 6 shows the folded figure-eight configuration of FIG. 5 being twisted into a second figure-eight configuration.

FIG. 7 shows the figure-eight configuration of FIG. 6 after the loops of the figure-eight have been folded together.

FIG. 9 is a cross section along the lines 9—9 of FIG. 8.

DETAILED DESCRIPTION OF THE PREFERRED EMBODIMENTS

Figure 8:
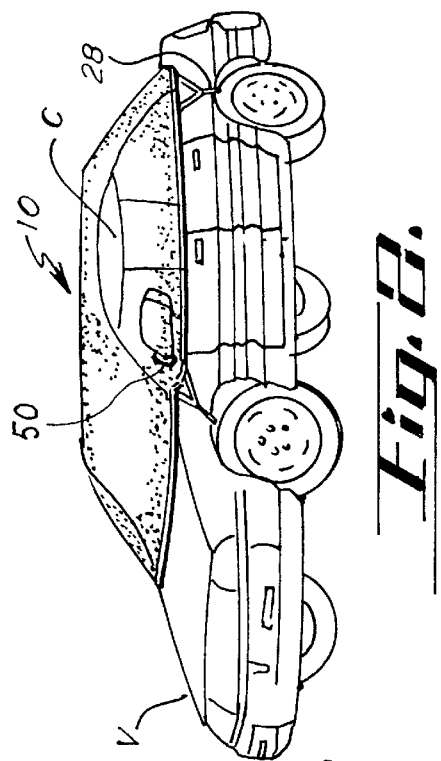
FIG. 8 is a detailed view of a portion of the self-deploying cover of the present invention showing the connectors for joining and adjusting the ends of the rod together and the opening in the sleeve for accessing the end connectors.

The self-deploying cover of the present invention is generally shown in the Figures as reference numeral 10.

The self-deploying cover 10 consists of a fabric sheet portion 12 having substantially the general dimensions of the cab C of the vehicle V. Herein the cab C is referred to as consisting of the roof, windshield, and side windows of the vehicle V.

The self-deploying cover 10 also has a collapsible, semi-rigid frame 14 along the periphery or encompassing the sheet portion 12. The frame 14 is sufficiently rigid that the cover can be oriented, lifted up and placed over the vehicle's cab and remain over the cab without sliding off while the cover is secured to the vehicle by one person. More particularly, as shown in FIG. 1, the frame 14 is rigid enough that the cover 10 can be pushed over the cab of the vehicle from the rear of the vehicle in the direction shown by the arrow. Similarly, the cover 10 can be pulled off the cab C. This is completely different from previous covers which must be thrown over the cab from one end or the side of the vehicle and which then have a tendency to slide off the vehicle. The orientation of the front, sides and rear of previous covers was impossible to learn of until the cover had been manually deployed. Instead, the frame 14 causes the cover 10 to properly encompass the cab C of the vehicle and remain in place thereon.

However, the semi-rigid frame is also collapsible so that the cover takes up a minimum amount of room for storage in the vehicle. The cover can be in an expanded state, as shown in FIG. 3, and may also be in a stored state as shown in FIGS. 5 and 7.

The self-deploying cover 10 also has first spring means 16 for deploying the cover from the stored state to the expanded state. The first spring means 16 makes the cover self-deploying, in that in the stored state the first spring means 16 is compressed and the first spring means 16 causes the cover 10 to self-deploy to the expanded state as the tension of the compressed first spring means 16 is released.

The first spring means 16 may be any type of spring, such as a standard coil spring or the equivalent. Preferably, the sheet portion 12 has a periphery 18 and a sleeve portion 20 is preferably formed within the periphery 18. The first spring means 16 may be contained within the sleeve portion 20.

Preferably, the first spring means 16 is twistable into a first folded figure-eight configuration by twisting the first spring means into a figure-eight with two loops, then folding the two loops together, thereby producing the stored state. This procedure is shown in FIGS. 4 and 5. FIG. 4 shows the first spring means 16 being twisted into a first folded figure-eight configuration. FIG. 5 shows the loops of the figure-eight configuration being folded together so that point D of one loop comes to oppose point C' of the other loop.

The first figure-eight configuration may not be small enough to store the cover 10 in the vehicle. Preferably, the first spring means 16 is therefore further twistable into a second folded figure-eight configuration by twisting the first folded figure-eight configuration into a second figure-eight with two loops, then folding the two loops together, thereby producing the stored state. This procedure is shown in FIGS. 6 and 7. In FIG. 6, the folded figure-eight configuration of FIG. 5 is twisted into a second figure-eight configuration. In FIG. 7, the loops of this second figure-eight configuration are brought together so that point E of one loop comes to oppose point F of the second loop.

It will be recognized that in the stored configuration, the first spring means 16 is compressed. Consequently, when the tension of the compressed first spring means 16 is released, the cover 10 will self-deploy to the expanded position shown in FIG. 3. This may be done, for example, by unfolding the loops of the second figure-eight configuration, then unfolding the loops of the first figure-eight configuration. Alternatively, the tension of the first spring means 16 may be such that the cover 10 may be deployed merely by throwing the cover 10 in its contracted state into the air.

The cover 10 also comprises first connectors 24 for attaching the cover 10 to the vehicle V.

In the case where the vehicle V is an automobile, the first connectors 24 may preferably be adjustable, stretchable or bunge-like straps 24 connected to the sheet portion 12 and clamps 28 on the ends of the straps 24 remote from the sheet portion 12, the clamps 28 engaging the automobile's wheel wells as best seen in FIG. 2. The straps 26 are preferably adjustable to accommodate different vehicle sizes and wheel well positions.

In the preferred embodiment, the first spring means 16 comprises a first elastic rod 30 joined at its ends by a second connector 32 and contained within the sleeve portion 20. The rod 30 is foldable between the expanded state and the stored state and in the expanded state the rod 30 outwardly tensions the periphery 18 of the sheet portion 12. The spring tension of the rod 30 self-deploys the cover 10 as the rod 30 springs from the stored state to the expanded state.

Preferably, the sleeve portion 20 may have a covered opening 34 therein for accessing the second connector 32 for adjusting the second connector 32 to change the size of the cover 10. The opening 34 may have a cover 36. The cover 36 may be closed, for example, by a hook-and-loop fastener (Velcro), or by snaps or clips.

In the preferred embodiment, the second connector 32 comprises a first clamp 38 with two rod-engaging portions 40, 42. As shown in FIGS. 8 and 9, each end of the rod 30 is held in one of the rod-engaging portions 40, 42. The expanded length of the rod 30 is adjustable by sliding the ends of the rod 30 through the rod-engaging portions 40, 42. In this way, the size of the cover 10 may be slightly adjusted for a tighter or looser fit.

The second connector 32 may also further comprise a second clamp 44 like the first clamp 38, as shown in FIG. 8. In the event the first clamp 38 should loosen or break, the second clamp 44 will still hold the ends of the rod 30 together.

The rod 30 is preferably made of fiberglass, but may also be any other elastic material that will provide a semi-rigid frame, such as steel, aluminum, or graphite. Most preferably, the rod is made of pultruded fiberglass strands bonded together with a polyester resin. Pultruding is the process of pulling the fiberglass rovings or strands through a die rather than pushing the strands through the die. This gives the fiber more integrity and strength. The rod is then reinforced by adding a matting around the strands which is coated with the polyester resin. This gives the rod cross-directional strength. This method of manufacture gives the rod a high level of flexibility without the strands breaking down.

The fabric sheet portion 12 is preferably made of a heat-proof and water-proof material. Examples of such materials are nylon and poly-cotton. The fabric sheet portion 12 should also preferably be resistant to ultra-violet light (UV). An example of such UV-resistant materials is the polypropylene fabrics Sentrex™ or Evolution™ from Kimberly-Clark of Roswell, Ga., or Sunbrella from Glen Raven Mills, Inc. of Glen Raven, N.C. The fabric sheet portion 12 may also consist of multiple layers of material with various capabilities, such as softness and UV-resistance.

The cover 10 may also have a mirror pocket 46 for engaging the side-view mirror M of the vehicle.

Optionally, a lock may be included with the cover 10 to secure the cover 10 to the vehicle. The lock is preferably a cable lock 50, which is well known, and may be threaded around the mirror pocket 46 and the mirror M.

Figure 10A:
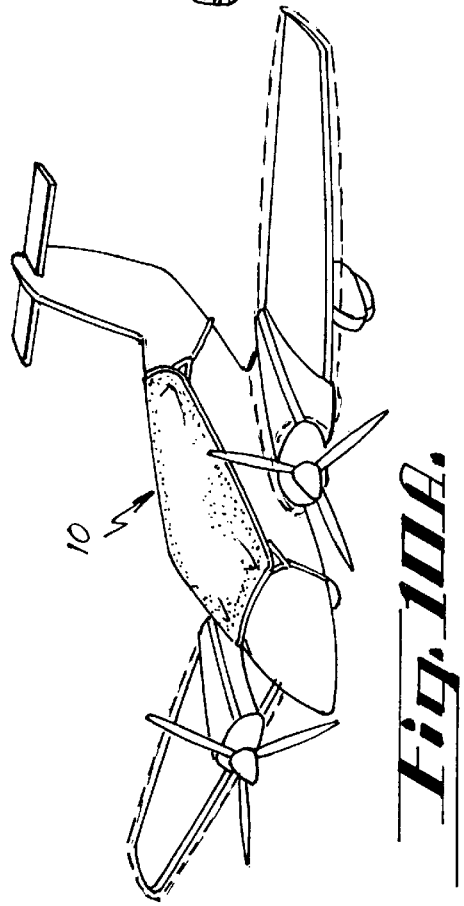
FIG. 10A shows the self-deploying cover of the present invention being deployed on an airplane, with self-deploying covers shown on the wings in phantom outline.
Figure 10B:
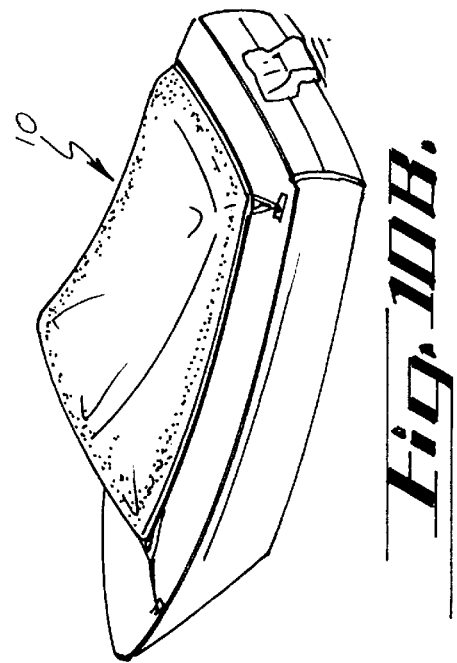
FIG. 10B shows the self-deploying cover of the present invention being deployed on a boat.

Although the primary purpose of the cover 10 is for use on an automobile, the cover 10 may also be used on an airplane as shown in FIG. 10A or on a boat as shown in FIG. 10B.

Figure 11:
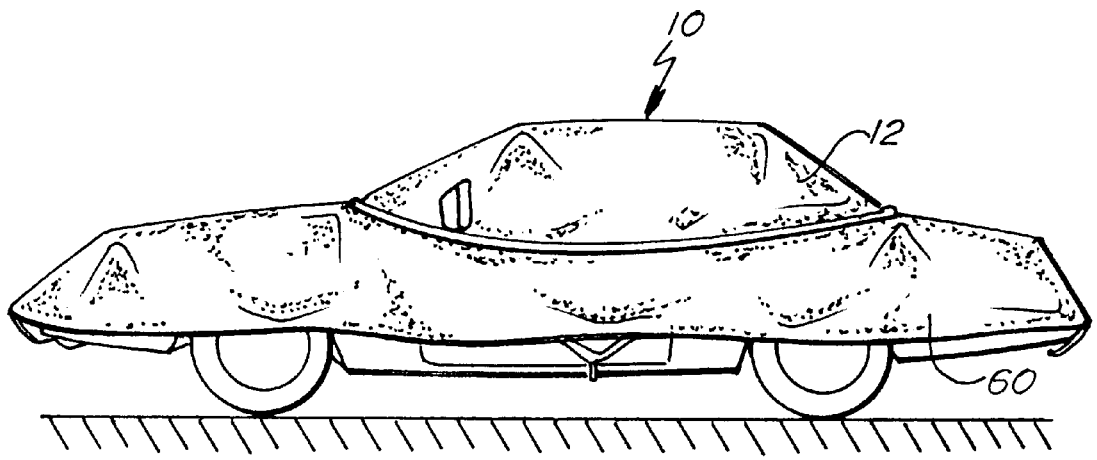
FIG. 11 shows a second embodiment of the self-deploying cover of the present invention.
Figure 13:
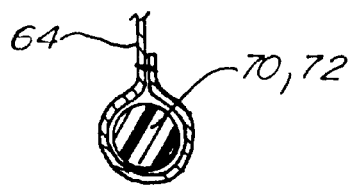
FIG. 13 is a cross section along the line 13 of FIG. 12.

A second embodiment of the cover 10 is shown in FIG. 11. In this second embodiment, a skirt 60 is attached to the sleeve portion 20 and covers further areas of the vehicle.

Figure 12:
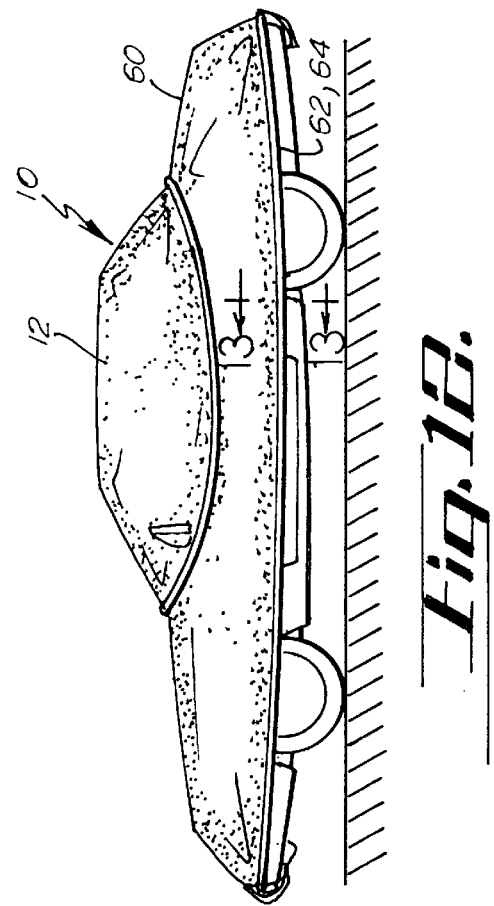
FIG. 12 shows a third embodiment of the self-deploying cover of the present invention.

A third embodiment of the cover 10 is shown in FIG. 12. In this embodiment, the skirt 60 has a border 62. A second sleeve portion 64 is formed in the skirt 60 on the border 62. A second spring means or stretch chord 70 may be contained within the second sleeve portion 64. The second spring means 70 holds the skirt 60 against the vehicle V. The second spring means 70 also makes the cover self-deploying, in that in the stored state the second spring means 70 is compressed and the second spring means 70 causes the skirt 60 to self-deploy to the expanded state as the tension of the compressed second spring means 70 is released.

The second spring means 70 may be any type of spring, such as a standard coil spring or the equivalent.

In the preferred embodiment, the second spring means 70 comprises a second elastic rod 72 joined at its ends and contained within the second sleeve portion 64. The rod 72 is foldable between the expanded state and the stored state and in the expanded state the rod 72 outwardly tensions the border of the skirt 60. The spring tension of the rod 72 self-deploys the skirt 60 as the rod 30 springs from the stored state to the expanded state.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A self-deploying cover for at least a portion of a vehicle, the cover comprising:

a fabric sheet having substantially the general dimensions of the portion of the vehicle when the cover is placed on the vehicle, the sheet having a periphery, a sleeve formed in the sheet adjacent the periphery of the sheet, first connectors for attaching the cover to the vehicle, an elastic rod joined at the ends thereof by a second connector and contained within the sleeve and foldable between an expanded state and a stored state, wherein in the expended state the rod outwardly tensions the periphery of the sheet and forms a semi-rigid frame and wherein the spring tension of the rod self-deploys the cover as the rod springs from the stored state to the expanded state; and wherein the sleeve has a covered opening therein for accessing the second connector, the second connector being adjustable to change the size of the cover.

2. The self-deploying cover of claim 1, further comprising a mirror pocket for the side-view mirror of the vehicle.

3. The self-deploying cover of claim 1 for use on an automobile, the first connectors further comprising a plurality of straps connected to the sheet and clamps on the ends of the straps remote from the sheet, the clamps engaging the vehicle wheel wells.

4. The self-deploying cover of claim 1, wherein the second connector comprises a first clamp with two rod-engaging portions, each end of the rod being held in one of the rod-engaging portions, and the expanded length of the rod being adjustable by sliding the ends of the rod through the rod-engaging portions.

5. The self-deploying cover of claim 4, further comprising a second clamp engaging the ends of the rods near the first clamp.

6. The self-deploying cover of claim 1, wherein the rod is twistable into a first folded figure-eight configuration by twisting the rod into a figure-eight with two loops, then folding the two loops together, thereby producing the stored state.

7. The self-deploying cover of claim 6, wherein the rod is further twistable into a second folded figure-eight configuration by twisting the first folded figure-eight configuration into a second figure-eight with two loops, then folding the two loops together, thereby producing the stored state.

8. The self-deploying cover of claim 1, wherein the rod is made of fiberglass.

9. The self-deploying cover of claim 1, wherein the fabric sheet portion is made of a water-proof material.

10. The self-deploying cover of claim 1, further comprising a lock for securing the cover to the vehicle.

11. The self-deploying cover of claim 1, wherein the vehicle is an automobile.

12. The self-deploying cover of claim 1, wherein the vehicle is an airplane.

13. The self-deploying cover of claim 1, wherein the vehicle is a boat.

14. A self-deploying cover for a vehicle having a cab, the cab including a roof, windshield and side windows, the cover comprising:

a fabric sheet having substantially the general dimensions of the cab and enclosing the cab when the cover is placed on the vehicle, the sheet having a periphery, a sleeve portion formed in the sheet adjacent the periphery of the sheet, a skirt attached to the sleeve and covering further areas of the vehicle, first connectors for attaching the cover to the vehicle, and an elastic rod joined at the ends thereof by a second connector and contained within the sleeve, and foldable between an expanded state and a stored state, wherein in the expanded state the rod outwardly tensions the periphery of the sheet and forms a semi-rigid frame and wherein the spring tension of the rod self-deploys the cover as the rod springs from the stored state to the expanded state.

15. The self-deploying cover of claim 14, wherein the rod is twistable into a first folded figure-eight configuration by twisting the rod into a figure-eight with two loops, then folding the two loops together, thereby producing the stored state.

16. The self-deploying cover of claim 15, wherein the rod is further twistable into a second folded figure-eight configuration by twisting the first folded figure-eight configuration into a second figure-eight with two loops, then folding the two loops together, thereby producing the stored state.

17. A self-deploying cover for a vehicle having a cab and a body, the cab including a roof, windshield and side windows, the cover comprising:

a fabric sheet having substantially the general dimensions of the cab and enclosing the cab when the cover is placed on the vehicle, the sheet having a periphery, a first sleeve formed in the sheet adjacent the periphery of the sheet, a skirt attached to the sleeve and covering the body of the vehicle, the skirt having a border, first connectors for attaching the cover to the vehicle, first spring means for deploying the sheet portion to an expanded state from a stored state, a second sleeve formed in the skirt on the border of the skirt, and second spring means for deploying the skirt to an expanded state from a stored state.

18. The cover of claim 17, wherein the first spring means further comprises a first elastic rod joined at the ends thereof by a second connector and contained within the first sleeve, and foldable between an expanded state and a stored state, wherein in the expanded state the rod outwardly tensions the periphery of the sheet portion and forms a semi-rigid frame and wherein the spring tension of the rod self-deploys the sheet as the rod springs from the stored state to the expanded state.

19. The cover of claim 17, wherein the second spring means further comprises a second elastic rod joined at the ends thereof and contained within the second sleeve, and foldable between an expanded state and a stored state, wherein in the expanded state the rod outwardly tensions the border of the skirt and wherein the spring tension of the rod self-deploys the skirt as the rod springs from the stored state to the expanded state.

* * * * *